Sept. 2, 1958  E. MORGENSTERN  2,849,920
REAR VIEW MIRROR CONSTRUCTION
Filed July 19, 1956  2 Sheets-Sheet 1
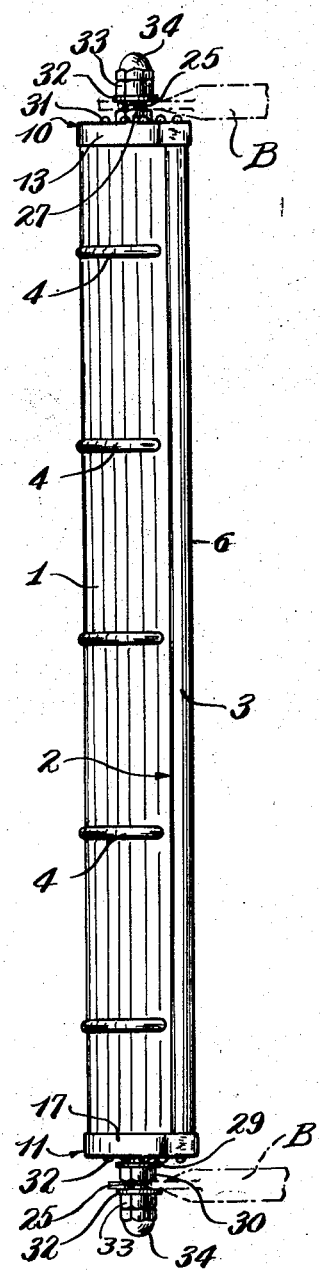
FIG.1
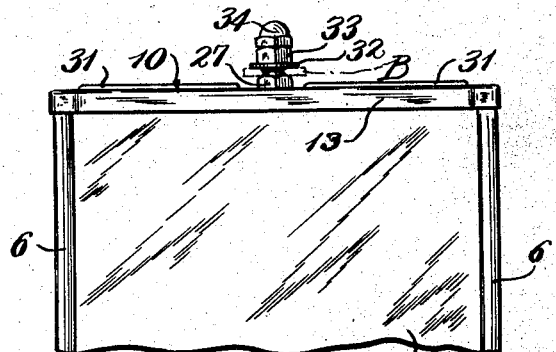
FIG.2
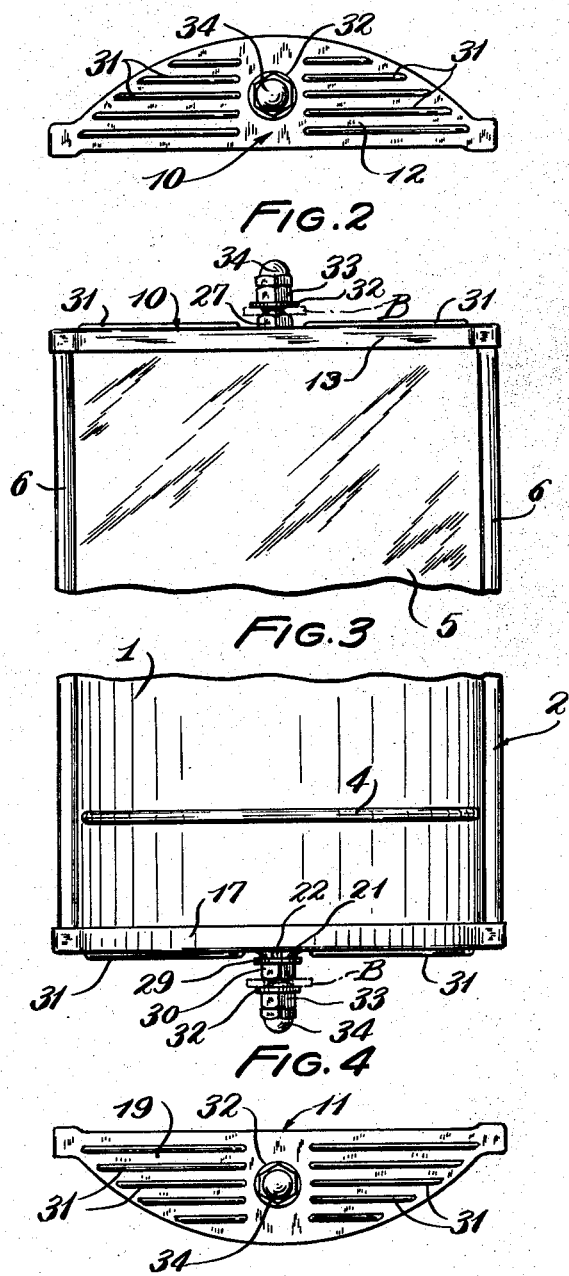
FIG.3
FIG.4
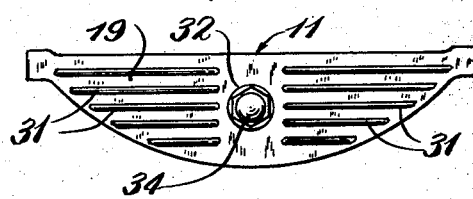
FIG.5
INVENTOR.
ELLIOTT MORGENSTERN
BY
Brennan B. West
ATTORNEY

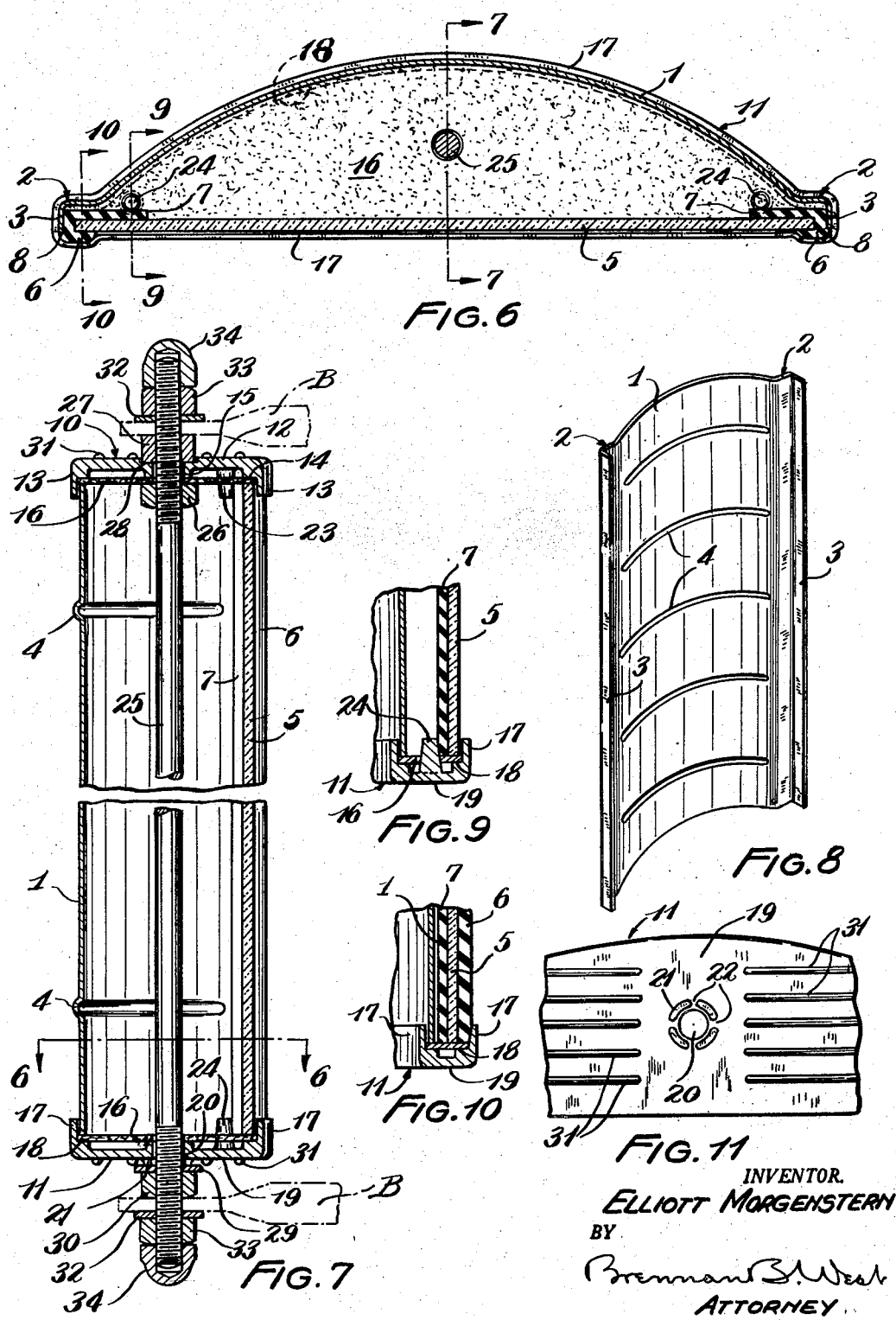

United States Patent Office 2,849,920
Patented Sept. 2, 1958

2,849,920

REAR VIEW MIRROR CONSTRUCTION

Elliott Morgenstern, University Heights, Ohio, assignor to The Electroline Manufacturing Company, Cleveland, Ohio, a corporation of Ohio Application July 19, 1956, Serial No. 598,772

4 Claims. (Cl. 88—98)

This invention relates to rear view mirrors, especially of the class used on trucks; and it has to do more particularly with an improved head construction for mirrors of the aforesaid class. The term "head" is used in the trade to designate the unit comprising the mirror and the casing in which it is mounted.

An object of the invention is to provide a rear view mirror head of high quality and good appearance, that is substantial and durable, and yet that is relatively inexpensive because of its simplified and advantageous construction.

Another object of the invention is to provide a mirror head construction that is composed of relatively few parts that are capable of being assembled and disassembled easily and quickly, thereby to expedite and cheapen production, and facilitate replacement of parts, such as the mirror in the event it becomes broken or otherwise damaged.

A further object of the invention is to provide a mirror head wherein the parts interfit with one another in such manner as to hold them in proper relation and which are secured together in assembled condition by means of a single tie rod that extends longitudinally through the casing and provides at the opposite ends thereof the means for attaching the mirror head to a supporting structure, such as brackets that are spaced apart in a vertical direction to receive the mirror head between them.

A further object of the invention is to provide a mirror head construction wherein the joints between the glass mirror and the casing are rendered leakproof by suitable sealing means of elastic or compressible material, and wherein the glass mirror is supported solely by the sealing means out of contact with the surrounding parts of the casing.

A still further object of the invention is to provide a mirror head construction wherein the casing is weatherproof and yet vented and drained so as to reduce condensation of moisture within the casing and drain such condensate as may form.

The objects and advantages above enumerated, with others that will appear as this description proceeds, are attained in the embodiment of the invention illustrated in the accompanying drawings, wherein like parts are designated by like reference numerals throughout the several views.

In the drawings,

Fig. 1 is a side elevational view of my improved rear view mirror construction;

Fig. 2 is a plan view thereof;

Figs. 3 and 4 are fragmentary front and rear elevational views, respectively, of the mirror head;

Fig. 5 is a bottom plan view thereof;

Fig. 6 is a horizontal section through the mirror head, drawn to a larger scale, the plane of section being indicated by the line 6—6 of Fig. 7;

Fig. 7 represents a vertical section from front to rear through the mirror head, as indicated by the line 7—7 of Fig. 6, the head being shown as broken away throughout its central region in order to shorten the figure;

Fig. 8 is a perspective view, on a reduced scale, of the front wall of the casing;

Figs. 9 and 10 are sectional details on the respective lines 9—9 and 10—10 of Fig. 6, and Fig. 11 is a fragmentary outside elevational view of the bottom cap of the casing, showing the central region thereof.

1 denotes a casing member that is desirably made of sheet metal of suitable gauge and that is in the form of a shallow channel. The major portion of the casing member is arcuate in cross section, as best indicated in Figs. 6 and 8, and its lateral edges are given an angular formation, as generally indicated at 2, that stiffens the member in a vertical direction. The portions 2 include rearwardly extending parallel flanges 3. In the present embodiment, the arcuate portion of the casing member is stiffened in a transverse direction by ribs 4.

Disposed within the open side of the casing member, substantially in the plane thereof, is a glass mirror 5, the lateral edges of which are embraced by grooved sealing strips 6. Said strips include relatively deep inner flanges 7 that overlie a substantial area of the reverse side of the mirror 5, and said strips include lips 8 that extend over and conceal the rear edges of the flanges 3. The sealing strips 6 are elastic and may be made of natural or synthetic rubber.

Top and bottom end caps 10 and 11, respectively, are engaged over the ends of the casing member 1 and mirror 5. The top end cap 10 has a wall 12 which corresponds in shape to the cross sectional shape of the casing member and mirror assembly, being somewhat larger in area, however, and said wall is surrounded by a relatively deep peripheral flange 13, on the inner side of which is formed a shoulder 14. At the opposite ends of the cap, the flange 13 defines a pocket within which is received the ends of the angular portions 2 of the casing member and the ends of the sealing strips 6. The wall 12 of the end cap 10 has within its central region an aperture 15, shown as surrounded by an internal boss, the distal end of which is in substantially the plane of the shoulder 14. A gasket 16 of suitable material, such as a mixture of rubber and cork, is confined within the flange 13 and is engaged with the shoulder 14. The mirror 5 and the sealing strips 6 are approximately equal in length to that of the casing so that all bear at their ends on the gasket 16. The gasket engages the distal end of the boss that surrounds the aperture 15 and is provided with a hole that is aligned with said aperture.

The bottom end cap 11 is much the same as the top end cap 10. It includes a peripheral flange 17 having an internal depressed shoulder 18 and surrounds a wall 19. The wall 19 is provided with an aperture 20 that is in axial alignment with the aperture 15 of the top end cap when the parts are in assembled relation, and projecting from the outer side of the wall 19 about the aperture 20 is an annular flange 21 that is interrupted by circumferentially spaced apart notches or voids 22.

A second gasket 16 is inserted in the bottom end cap and is supported about its edge by the shoulder 18 and centrally of the end cap by a hollow boss that rises from the wall 19 about the aperture 20, the gasket having a hole aligned with said aperture.

Carried by, and desirably formed integral with, the respective end caps 10 and 11 are projections or posts 23 and 24 that are spaced inwardly a suitable distance from the ends of the caps and are engaged with the flanges 7 of the sealing strips 6, thereby to support the mirror against appreciable movement inwardly of the casing member; and it will be observed, particularly from Figs. 6 and 9 with respect to the bottom end cap, and the same applies also to the top end cap, that the strips 6 space the mirror 5 slightly from the adjacent rear portions of the peripheral flanges of the end caps.

A tie rod 25, that is threaded a suitable distance inwardly from its opposite ends, extends axially through the casing member 1 and has its end portions projected through the holes in the gaskets 16 and through the apertures 15 and 20 of the respective end caps 10 and 11. I desire to secure the rod to the top end cap 10 by clamping the latter, along with the adjacent gasket 16, between an inner nut 26 and an outer nut 27 that are applied to the adjacent threaded end of the tie rod; and to facilitate the assembling of these parts I provide a depression 28 in the wall 12 of the cap 10 into which the nut 27 fits so as to be held against turning with respect to the cap. When the inner nut 26 is turned up tightly, the joint between the rod and the surrounding portion of the top end cap is rendered leakproof by the presence of the gasket 16.

The lower end of the tie rod 25 is projected through the hole in the corresponding gasket 16 and through the aperture 20 of the bottom end cap, and a washer 29 and a nut 30 are applied to the protruding end of the rod and are drawn up against the flange 21. The notches or voids 22 of said flange provide venting means for the interior of the mirror head, thereby to minimize condensation of moisture therein, and at the same time provide a drain for any condensate that may form within the head. This venting means, however, is of such small capacity, and is so located, that there is no likelihood of melting snow or rain reaching the interior of the mirror head.

The end portions of the tie rod 25 that extend beyond the nuts 27 and 30 serve as studs for attaching the mirror head to supporting means, such as brackets B that are indicated in broken lines in Figs. 1 and 7.

I have already mentioned the fact that the casing member 1 is preferably made of sheet metal, which adapts the member to inexpensive die forming to include the angular portions 2 and stiffening ribs 4. The end caps are desirably die cast, so that practically no finishing work or machining is required, and the walls 12 and 19 of the respective end caps 10 and 11 may be strengthened and decorated by external ribs 31.

Shown as applied to the extremities of the tie rod 25, above and below the supporting means or brackets B, are washers 32, conventional nuts 33, and finishing nuts 34.

It will be seen from the foregoing description that my invention provides a very substantial mirror head construction, one that is durable in service, that is attractive in appearance, and that is composed of relatively few parts that are especially convenient of assembly and disassembly. The tie rod 25, with the abutment means or nuts applied to its threaded ends, serves as the means for firmly securing all parts of the structure together, as well as for mounting the mirror head in a supporting means.

It is evident, also, that the mirror is well protected by the elastic sealing strips 6 and the rear portions of the peripheral flanges of the end caps; and that it is yieldingly sustained within the casing and thus relieved of shock in case it is accidentally struck a blow that might otherwise break the mirror.

Having thus described my invention, what I claim is:

1. In a rear view mirror construction, a casing open along its rear side and at its ends, a mirror disposed within the open side of the casing in substantially the plane thereof and being of a length approximately equal to that of the casing, sealing strips between the lateral edges of the mirror and the adjacent edge portions of the casing, end caps fitted over and enclosing the opposite ends of the casing and mirror, sealing gaskets between the ends of the casing and mirror and opposed portions of the end caps, the end caps having substantially aligned apertures, a tie rod extending longitudinally through the casing and having its ends projected through said apertures, abutment means applied to the rod on the inner and outer sides of one of the end caps for securing the rod to said cap against longitudinal movement with respect to the cap, and abutment means applied to the tie rod on the outer side of the other end cap for holding the end caps to the opposite ends of the casing and mirror.

2. In a rear view mirror construction, a casing open along its rear side and at its ends, a mirror of substantially the same length as the casing, said mirror being disposed within the open side of the casing in substantially the plane thereof, sealing strips between the lateral edges of the mirror and the adjacent edge portions of the casing, end caps fitting over and enclosing the opposite ends of the casing and mirror, sealing gaskets between the ends of the casing and mirror and opposed portions of the end caps, tie means extending lengthwise through the casing and operatively connected to the end caps and adjustable with respect to at least one of said caps for drawing the end caps toward each other and sealing them by virtue of said gaskets to the ends of the casing and mirror, and posts extending inwardly from each end cap in laterally spaced relation to each other and forwardly of the mirror for sustaining the mirror against movement inwardly of the casing, each sealing gasket having holes through which the posts of the adjacent end cap project.

3. In a rear view mirror construction, a vertically disposed casing member in the form of a rearwardly opening channel, a rectangular mirror disposed between the lateral edges of the casing member in substantially the plane thereof and which is coextensive in length with the casing member, grooved elastic strips embracing the lateral edges of the mirror and engaged with the lateral edge portions of the casing member, and top and bottom caps applied to and enclosing the respective top and bottom ends of the casing member and mirror, sealing gaskets occupying said caps and interposed between portions thereof and the ends of the casing member and mirror, the ends of the aforesaid sealing strips engaging said gaskets, each cap having an aperture substantially aligned with the aperture of the other cap, a tie rod extending lengthwise through the casing member and having its ends projected through the apertures of the caps, the aperture of the bottom cap being of greater cross sectional area than the portion of the rod that occupies said aperture, abutment means applied to the outer ends of the rod for holding the caps firmly against the ends of the casing member and mirror, and ventilating and drainage spacing means between the bottom cap and the adjacent abutment means.

4. In a rear view mirror construction, a casing member in the form of a rearwardly opening channel having parallel lateral edges, a rectangular mirror disposed between said edges, grooved elastic strips embracing the lateral edges of the mirror and cooperating with the adjacent edge portions of the casing member to seal the joints between said edge portions and the lateral edges of the mirror, the casing member, mirror and edge strips being of approximately the same length, end caps applied to the opposite ends of the casing member and mirror, each end cap having a peripheral flange that encloses the adjacent ends of the casing member and mirror, each end cap including, also, a gasket seat inset from the edge of said peripheral flange, gaskets engaged with said seats of the end caps and compressed between the same and the ends of the casing member and mirror, internal projections on the end caps engaging the edge strips so as to hold the mirror against appreciable movement inwardly of the casing, parts of the edge strips engaging contiguous parts of the peripheral flanges for sustaining the mirror out of contact with said flanges.

References Cited in the file of this patent

UNITED STATES PATENTS

| | | |
|---|---|---|
| 1,110,973 | Tischler | Sept. 15, 1914 |
| 2,498,065 | Budreck | Feb. 21, 1950 |
| 2,585,273 | Prutzman | Feb. 12, 1952 |
| 2,722,160 | Prutzman | Nov. 1, 1955 |